(12) United States Patent
Young

(10) Patent No.: US 6,229,861 B1
(45) Date of Patent: May 8, 2001

(54) CLOCK DISTRIBUTION NETWORK UTILIZING LOCAL DESKEWING CLOCK GENERATOR CIRCUITRY

(75) Inventor: Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/486,935

(22) Filed: Jun. 7, 1995

(51) Int. Cl.$^7$ ........................................................ H04L 7/00
(52) U.S. Cl. ........................... 375/356; 375/371; 375/376
(58) Field of Search ........................... 371/1; 375/354, 375/356, 371, 376; 327/141, 144, 151; 370/503

(56) References Cited

U.S. PATENT DOCUMENTS

| | | | |
|---|---|---|---|
| 5,059,818 | * 10/1991 | Witt et al. ........................... | 328/63 |
| 5,298,866 | 3/1994 | Kaplinsky .......................... | 328/155 |
| 5,307,381 | 4/1994 | Ahuja ................................. | 375/107 |
| 5,339,253 | 8/1994 | Carrig et al. ...................... | 364/489 |
| 5,361,277 | 11/1994 | Grover ............................... | 375/141 |
| 5,376,842 | 12/1994 | Honoa et al. ..................... | 326/21 |
| 5,397,943 | 3/1995 | West et al. ........................ | 326/39 |
| 5,398,262 | 3/1995 | Ahuja ................................. | 375/356 |
| 5,570,054 | * 10/1996 | Takla ................................. | 327/292 |

\* cited by examiner

Primary Examiner—Tesfaldet Bocure
(74) Attorney, Agent, or Firm—Blakely, Sokoloff, Taylor & Zafman LLP

(57) ABSTRACT

A clock signal distribution network for a high-speed microprocessor includes a clock synthesizer coupled to receive an externally generated clock signal. The clock synthesizer deskews the external clock to generate an internal clock signal, which is then distributed about the semiconductor die by a conductivity tree. A set of local deskewing clock generators are coupled to branch interconnects of the tree and function as a zero-delay buffers for driving proximally located circuitry.

14 Claims, 3 Drawing Sheets

CLOCK DISTRIBUTION NETWORK UTILIZING LOCAL DESKEWING CLOCK GENERATOR CIRCUITRY

FIELD OF THE INVENTION

The present invention pertains to the field of very large scale integrated circuits fabricated on a single semiconductor die. More particularly, the invention relates to distribution of clock signals across a very large scale integrated circuit such as a microprocessor.

BACKGROUND OF THE INVENTION

Very large integrated circuits often operate synchronous to a clocking signal which acts as a timing reference. A great variety of devices operate in this manner. Perhaps most notable within this class of circuits are microprocessors and other data processing devices which can operate at frequencies up to 100 MHz. Future generations of processors are expected to approach astonishing speeds, e.g., 500 MHz to greater than 1 GHz.

In such circuits there is a need to couple the clocking signal to each of the functional blocks distributed about the semiconductor chip. This means that integrated circuits operating synchronously, such as a microprocessor, have a need for a network that distributes the clock signal across the chip. In a typical microprocessor, for example, the clock signal is often generated internal to the chip from an external signal that provides a reference frequency input. The external clock signal is commonly derived from a crystal resonator circuit. The internally generated reference clock signal is then coupled to the various functional units or logic clusters of the microprocessor. Synchronous logic functions obviously imply the need for some sort of clock distribution network.

As operating frequencies for very large integrated circuits such as microprocessors increase, the problem of how to effectively synthesize the clock signal across the chip becomes more difficult to solve. The reason is because a normal clock signal distribution network introduces different delays to the clock signal (i.e., clock skew) in different branches of the network. The factors causing clock skew include electromagnetic propagation delays (RCL), buffer delays in the distribution network, and resistive-capacitive (RC) delays associated with the various distribution lines which make up the entire distribution network. In addition, clock skew can vary across the surface of the semiconductor die due to variations in the manufacturing process, temperature gradients, power supply variations and differing load capacitance.

To give a better idea of the monumental task facing circuit designers and computer architects, future generations of microprocessors are targeted to operate at frequencies of 500 MHz and greater. At these extraordinary frequencies, the clock signal must still be coupled to more than ten million transistors distributed about a semiconductor die having an area of approximately 650 mils$^2$.

One of the major difficulties distributing a high-speed clock signal globally across a spacially huge microprocessor chip is the problem of logic gate loading. In the past, various techniques have been proposed to eliminate clock skew within a clock signal distribution network. These approaches have generally included the use of a chain of isolation buffers that try to drive the load capacitance of the logic gates without delay. The prior art includes numerous examples of different clock distribution networks designed to achieve low clock skew across a large chip. For example, U.S. Pat. Nos. 5,289,866; 5,307,381; 5,339,253; 5,361,277; 5,376,842; 5,397,943; and 5,398,262 describe clock distribution networks and circuitry all sharing the common goal of reduced clock skew in a very large scale integrated circuit such as microprocessor.

As will be seen, the present invention provides a method and apparatus for clock signal distribution that is ideally-suited for a high-performance, high-frequency data processing device. The invention enables a high-frequency clock (e.g., 500 MHz or higher) to be distributed in a high-performance circuit such as a microprocessor with a minimum amount of skew relative to a global system clock. The invention also minimizes the amount of skew variability in the clock distribution network arising from die interconnect resistance, interconnect capacitance, interconnect inductance and transistor parameter variability across the die. Furthermore, the invention reduces sources of phase jitter at the clock distribution end points.

SUMMARY OF THE INVENTION

The subject matter of the present invention is a clock signal distribution network for a high-speed integrated circuit (IC) such as a microprocessor. The invention minimizes clock skew and equalizes loading to functional units or clusters of logic disposed around the chip. The invention also eliminates clock buffer delay so that localized logic signals within a unit or cluster can operate with temporal proximity (i.e., timing margin).

In one embodiment, the invention includes a clock synthesizer coupled to receive an externally generated clock signal. The clock synthesizer deskews the external clock to generate an internal clock signal. This internal clock signal is then distributed about the semiconductor die by a "tree" of conductive traces or lines. The conductivity tree comprises a root node and a plurality of branch interconnects. The root node of the conductivity tree is coupled to the clock synthesizer, and the plurality of branch interconnects are distributed about the integrated circuit. Each of the branch interconnects has a characteristic impedance that is substantially matched to one another.

The invention further includes a plurality of local deskewing clock generators distributed about the chip. Each local deskewing clock generator is coupled to a corresponding branch interconnect of the conductivity tree and functions as a zero-delay buffer for generating a local clock signal from the internal global clock signal. The local clock signal drives a portion of the functional units and cluster logic circuitry of the integrated circuit that is proximal to the local deskewing clock generator.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

DETAILED DESCRIPTION

The present invention covers a clock distribution network for a synchronously operated integrated circuit. In the following description, numerous specific details are set forth such as particular circuit configurations, devices, interconnections, etc., in order to provide a thorough understanding of the present invention. It should be understood, however, that these specific details are not necessarily required to practice the present invention. In other instances, well known structures, circuits, method, etc., have not been shown or discussed in detail in order to avoid obscuring the invention.

Figure 1:
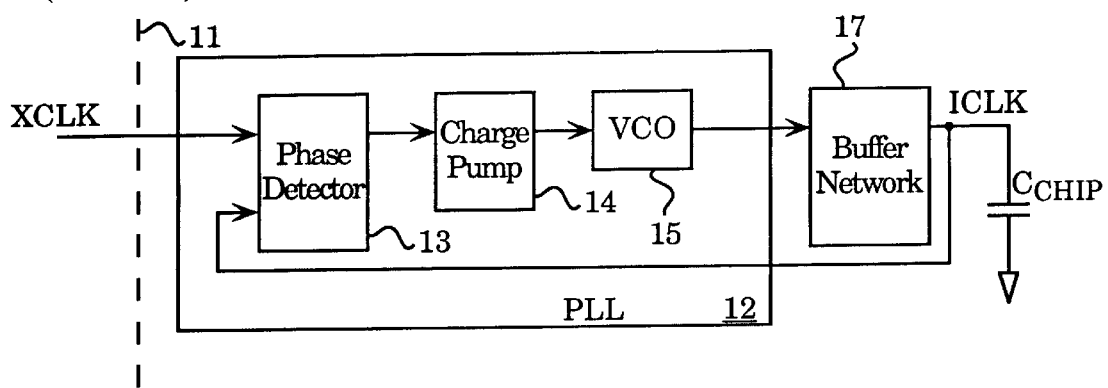
FIG. 1 illustrates a basic phase-locked loop circuit used in a prior art clock distribution scheme.

FIG. 1 shows a conventional scheme for generating an internal clock signal (ICLK) from an externally generated reference clock signal (XCLK) coupled to a microprocessor 11. A phase-locked loop (PLL) 12 receives the external clock signal as an input to microprocessor 11. PLL 12 is represented in FIG. 1 as comprising a standard feedback circuit which includes phase detector 13, charge pump 14, and voltage-controlled oscillator (VCO) 15. PLL 12 essentially operates as an input buffer for achieving zero skew between the external clock signal XCLK and the internal clock signal ICLK that drives the internal logic gates of the processor.

A large buffer network 17 is often needed to produce a sufficiently strong driving current for the various functional blocks of the microprocessor. In FIG. 1, the load capacitance that must be driven by the internal clock signal is represented as $C_{CHIP}$. As microprocessor designs increase the number of transistors built on the silicon substrate, chip capacitance $C_{CHIP}$ increases along with the complexity of buffer delay network 17. With respect to maintaining zero skew between the external clock signal XCLK and the internal clock signal ICLK, the increase in circuit size has not been problematic because PLL 12 virtually eliminates phase error between the two clock signals. Otherwise stated, PLL 12 is very good at maintaining the critical timing relationships (e.g., setup and hold) for input/output (I/O) signals referenced to either XCLK or ICLK.

But another problem has been created. Because buffer network 17 has increased in complexity— with individual branching networks having many associated delays— matching between branches in the clock distribution network has been difficult to achieve. Additionally, as the semiconductor die increases in total area, variations in effective channel length, threshold voltage, process and temperature variations, etc., have caused great variability in the buffer signal delay (DC) throughout the network. From an AC perspective, phase jitter— which used to be dominated simply by VCO 15 in PLL 12— has become much worse in larger processor devices due to more buffer delays and variations in power supply voltage and noise across the chip.

Figure 2:
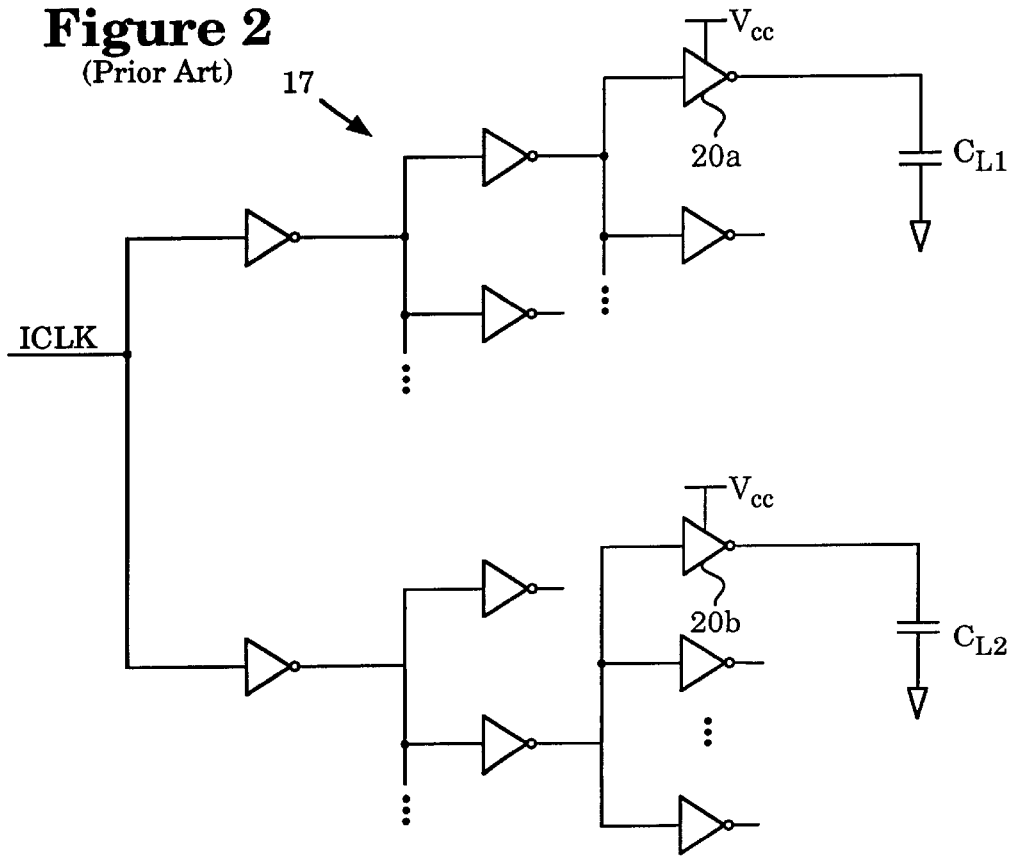
FIG. 2 illustrates a network of buffers used in a prior art clock distribution scheme.

This situation is illustrated in FIG. 2 which shows a traditional distribution network 17. Network 17 comprises an interconnected network of buffers 20 arranged in a connected "tree" structure. The tree structure is designed to provide sufficient driving current for the clock signal ICLK to the various functional logic blocks distributed across the semiconductor die. For example, in FIG. 2, buffer 20a might be located in proximity to the upper right hand corner of the chip and drive a load represented by capacitance $C_{L1}$. On the other hand, buffer 20b might located in proximity to the lower left hand corner of the chip and drive a cluster of logic gates represented by load capacitance $C_{L2}$.

Due to variations in power supply and noise between opposite corners of the chip, as well as differences in buffer delay and clock signal matching, the timing relationship between the outputs of buffers 20a and 20b may vary significantly. This variation can be worse from both a DC perspective (i.e., delay) as well as a from an AC standpoint (i.e., jitter). Practitioners familiar with the art of semiconductor chip design will appreciate that if jitter exists between logic circuitry located in two different regions of the die, the result may be a severe degradation in the device's ability to perform logic functions within a specified timing margin.

Figure 3:
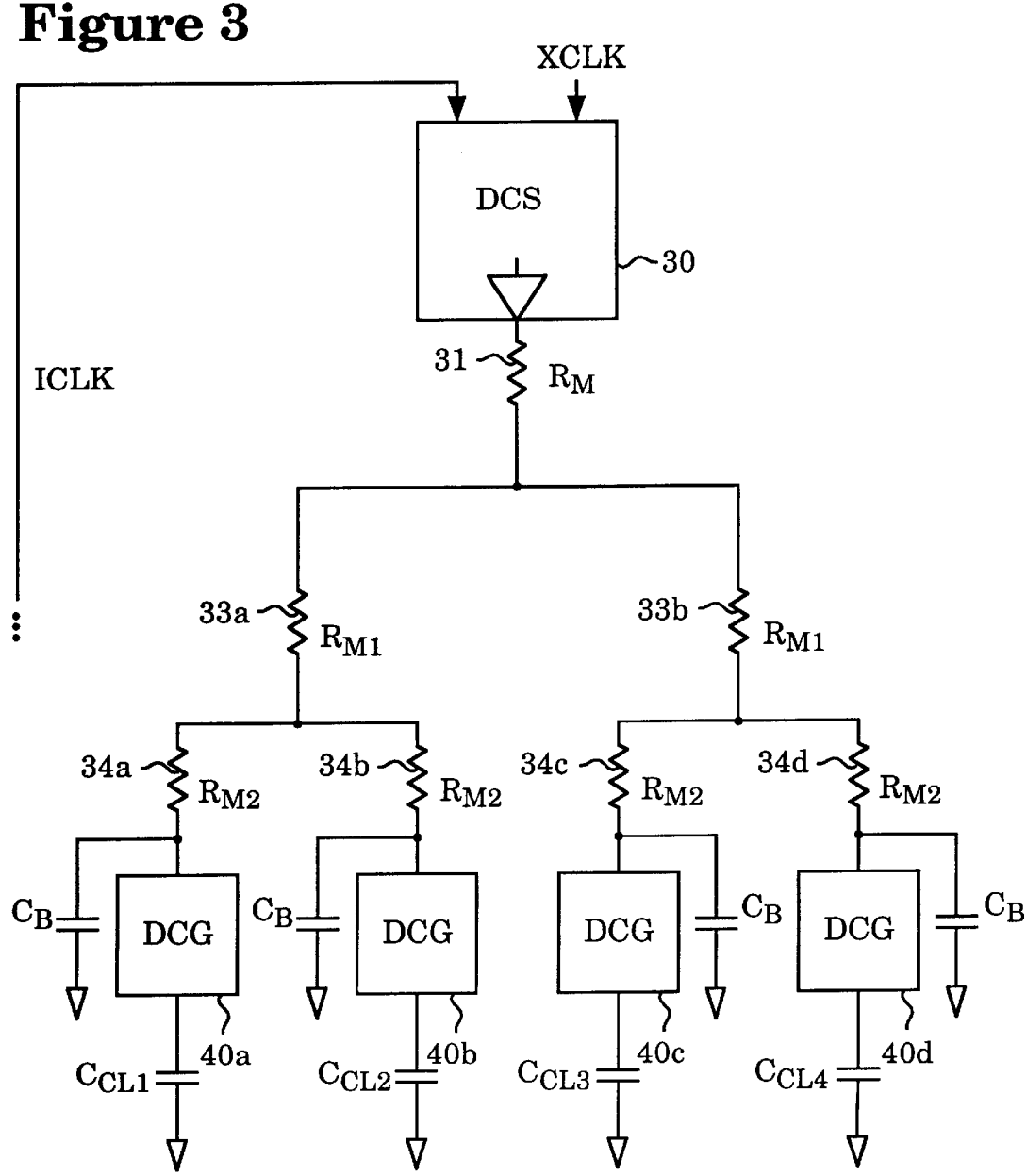
FIG. 3 is a conceptual diagram showing the clock distribution network according to one embodiment of the present invention.

FIG. 3 is a diagram illustrating the design approach of one embodiment of the present invention. FIG. 3 is a clock distribution network that solves the aforementioned problems by minimizing the amount of skew variability in the clock distribution tree caused by the variability factors described above. The network of FIG. 3 utilizes a global deskewing clock synthesizer (DCS) 30 that essentially functions as a zero-delay buffer. In one implementation, DCS 30 comprises a phase-locked loop based circuit that synthesizes the external clock signal, XCLK, to the proper internal clock ratio required by a high-frequency microprocessor (e.g., ICLK). Preferably, DCS 30 is located in a corner or near an edge of the semiconductor die to match power supply voltage, temperature and the effective channel length of the transistors, making each of these as common as possible for the global clock.

From DCS 30, the internal clock signal is distributed using an optimized RCL tree which is shown in FIG. 3 comprising resistive elements 31, 33, 34 and capacitors $C_B$. The capacitance $C_B$ represents the ordinary interconnect capacitance associated with the metal lines or traces coupling the clock signal from DCS 30 to the local deskewing clock generator (DCG) buffers 40. The DCG buffers 40 locally deskew and distribute the internal clock signal to a sub-region of the processor die (i.e., clock domain). One of the purposes of the local deskewing generator circuits is to buffer the clock subregion (domain) gate load from the global DCS 30. By doing so, the amount of delay caused by the global clock distribution is minimized. Note that in the clock distribution shown in FIG. 3, each of the passive elements (e.g., $R_M$, $R_{M1}$, etc.) is matched. Otherwise stated, the branch RCL 33a is matched with the corresponding branch RCL 33b; branch RCL 34a is matched with RCL 34b; RCL 34c is matched with RCL 34d, and so on.

By matching interconnect resistance, capacitance, and inductance in corresponding branches of the distribution network, the global clock signal delivered to the various functional units of the chip has an evenly balanced delay. Further, because each of the clock domain gate loads (represented as capacitances $C_{CL1}$, $C_{CL2}$, $C_{CL3}$ and $C_{CL4}$) are buffered by corresponding DCG buffers 40a–40d, the amount of delay generated by the RC network from DCS 30 is minimized. While there are unavoidable variations in the interconnect resistance and capacitance of the distribution network shown in FIG. 3, the amount of clock phase variation between the individual branches of the clock distribution tree is minimized because of the balanced RC delay. Note that each of the DCG buffers 40 presents a small, but equal, input load capacitance to clock synthesizer circuit 30 to minimize signal delay.

In accordance with the present invention, DCG buffers 40 may comprise any one of a number of deskewing clock generator circuits. However, careful system design may dictate that DCG buffers 40 comprise a deskewing generator circuit which is of a different type than that of clock synthesizer 30. That is, one possible embodiment of the invention might utilize a phase-locked loop circuit for global clock synthesizer 30, and implement the local deskewing buffers 40 with a delay line loop (DLL) to avoid the problem of jitter gain. For example, U.S. Pat. No. 5,317,202 describes a delay line loop circuit suitable for use as a local deskewing clock generator in accordance with the present invention. (U.S. Pat. No. 5,317,202 is assigned to the assignee of the present invention and is herein incorporated by reference.)

Use of local deskewing clock generators 40 enables the internal clock signal to be driven from a relatively light capacitive load to a much heavier capacitive load with virtually zero delay. Since each DCG 40 is intended to be proximal to a logic cluster or a specific region of the chip, temperature and process variations across the chip are largely eliminated. Also, because each DCG 40 is localized local buffer delay is eliminated and transistor mismatching has little effect. The key devices that require matching between DCGs are just those setting the phase error in the phase detector. It is appreciated that power supply lines which extend across the chip should be maintained with minimum supply noise to minimize the sensitivity of the DCG buffer circuitry.

AC clock signal variation appears at the logic gate loads as phase jitter. Note that in the diagram of FIG. 3, phase jitter may be generated by DCS 30, the passive distribution network, and DCG buffers 40. With respect to the external clock signal XCLK the contribution from each of these jitter sources is additive, resulting in a skew between clock edges of ICLK (at the logic gate load) relative to XCLK. This is frequently referred to as global jitter. Branch distribution jitter appears as global jitter between different ICLK domains.

One of the important features of the present invention, however, is that global XCLK to ICLK jitter is not seen within the local functional unit block level. This is because jitter present in DCG buffer 40a occurs only locally and is relative to the previous cycle of clock (cycle-to-cycle period change); it is not additive with jitter produced with DCS 30, which is only important with respect to the I/O logic. In other words, jitter produced by DCS 30 only affects I/O timing; it has little or no effect on clock period variations within the individual logic clusters or functional unit blocks.

Note that if the DCS is designed to provide low I/O timing jitter, cycle-to-cycle jitter will be very good. For example, jitter from DCS 30 does not influence timing margins for the group of loads represented by $C_{CL1}$ because of the use of DCG buffer 40a. Speaking figuratively, the internal core logic only cares about skew from one region of the die to another. Skew resulting from DCS 30 is not seen at the local functional unit block level. (Of course, timing margins may need to be widened in the situation where there is significant signal interaction between different units or clusters on the chip; especially if they are disposed at opposite ends of the chip.)

Figure 4:
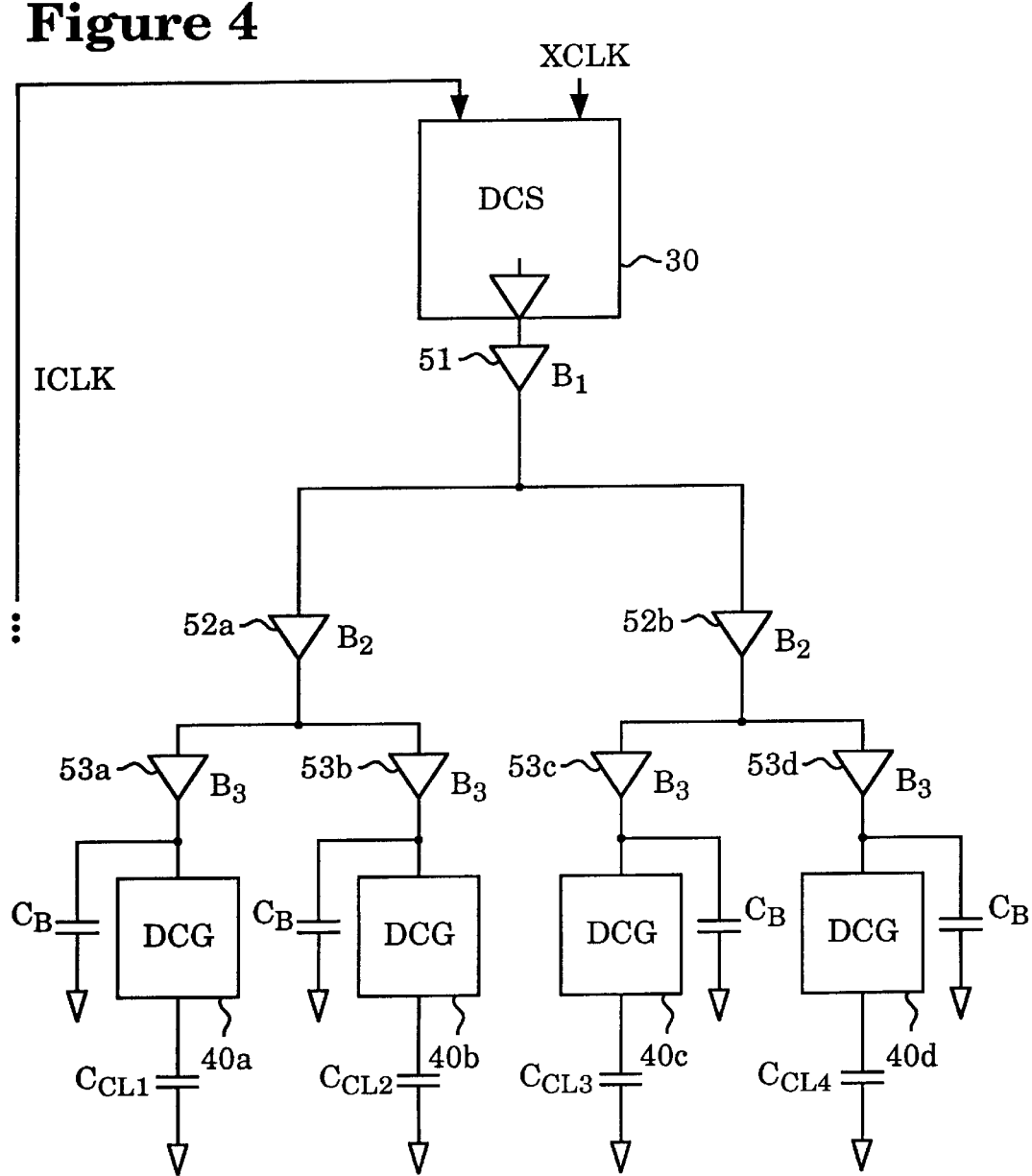
FIG. 4 is a conceptual diagram showing another embodiment of the present invention.

FIG. 4 is another embodiment of the clock distribution network of the present invention. Whereas the embodiment of FIG. 3 illustrates an entirely passive interconnect tree structure, FIG. 4 shows an implementation which utilizes active devices (e.g., buffers) in the connective branches. By way of example, buffers 51, 53, and 54 are shown in respective branches of the network. As before, it is important to closely match transistors in corresponding buffers (e.g., 53a and 53b, etc.) of the tree to minimize delay mismatching.

Practitioners will appreciate that the embodiment of FIG. 4 is useful for applications which may require additional clock signal driving strength.

I claim:

1. A clock distribution network for an integrated circuit (IC) comprising:
    a clock synthesizer coupled to receive an external clock signal and generate an internal clock signal therefrom;
    a conductivity tree comprising a passive network having a root node and a plurality of branch interconnects, the root node of the conductivity tree being coupled to the clock synthesizer with the plurality of branch interconnects being distributed about the IC, the branch interconnects each having a characteristic impedance that is substantially matched to one another;
    a plurality of local deskewing clock generators (DCGs) distributed about the IC, each DCG being coupled to a corresponding branch interconnect of the conductivity tree and functioning as a zero-delayed buffer for generating a local clock signal from the internal clock signal, the local clock signal driving logic circuitry of the integrated circuit in temporal proximity to the DCG.

2. A method of providing a clock signal to functional logic blocks distributed across a microprocessor comprising the steps of:
    synthesizing a global clock signal in the microprocessor from an external clock signal, the global clock signal having substantially zero skew relative to the external clock signal;
    providing a distribution tree of interconnects comprising passive network of metalized traces patterned across the microprocessor, the distribution tree coupling the global clock signal to the functional logic blocks, each functional logic block being coupled to a branch of the distribution tree;
    generating a locally deskewed clock signal from the global clock signal at each functional logic block using a local deskewing circuit which matches the load capacitance of each branch, wherein the local deskewing circuit comprises either a phase-locked loop or a delay line circuit.

3. The method of claim 2 wherein each branch of the distribution tree has a matched impedance.

4. The method of claim 2 wherein each functional logic block comprises a load capacitance to the local deskewing circuit that is substantially greater than the load capacitance of each branch.

5. A clock distribution network for an integrated circuit (IC) which includes clusters of logic, the network comprising:
    global deskewing clock means for generating an internal clock signal;
    a conductivity tree comprising a passive network having a plurality of branch interconnects coupled to the global deskewing clock circuit and distributed about the IC;
    means coupled to a branch interconnect of the conductivity tree for locally deskewing the internal clock signal and for generating a local clock signal therefrom, the local clock signal synchronously operating a logic cluster in temporal proximity to the local deskewing means.

6. The clock distribution network of claim 5 wherein the branch interconnects each have a characteristic impedance that is substantially matched.

7. The clock distribution network of claim 5 wherein the global deskewing clock means comprises a phase-blocked loop circuit.

8. A clock distribution network for an integrated circuit (IC) comprising:

a clock synthesizer coupled to receive an external clock signal and generate an internal clock signal therefrom;

a conductivity tree having a root node and a plurality of branch interconnects, the root node of the conductivity tree being coupled to the clock synthesizer with the plurality of branch interconnects being distributed about the IC, the branch interconnects each having a characteristic impedance that is substantially matched to one another, the connectivity tree including active elements, with signal delay through the active elements in any pair of branch interconnects being substantially equal;

plurality of local deskewing clock generators (DCGs) distributed about the IC, each DCG being coupled to a corresponding branch interconnect of the conductivity tree and functioning as a zero-delayed buffer for generating a local clock signal from the internal clock signal, the local clock signal driving logic circuitry of the integrated circuit in temporal proximity to the DCG.

9. A method of providing a clock signal to functional logic blocks distributed across a microprocessor comprising the steps of:

synthesizing a global clock signal in the microprocessor from an external clock signal, the global clock signal having substantially zero skew relative to the external clock signal;

providing a distribution tree of interconnects comprising an active network coupling the global clock signal to the functional logic blocks, each functional logic block being coupled to a branch of the distribution tree;

generating a locally deskewed clock signal from the global clock signal at each functional logic block using a local deskewing circuit which matches the load capacitance of each branch, wherein the local deskewing circuit comprises either a phase-locked loop or a delay line circuit.

10. The method of claim 9 wherein each branch of the distribution tree has a matched impedance.

11. The method of claim 9 wherein each functional logic block comprises a load capacitance to the local deskewing circuit that is substantially greater than the load capacitance of each branch.

12. A clock distribution network for an integrated circuit (IC) which includes clusters of logic, the network comprising:

global deskewing clock means for generating an internal clock signal;

a conductivity tree having a plurality of branch interconnects coupled to the global deskewing clock circuit and distributed about the IC, the connectivity tree including active elements, with signal delay through the active elements in any pair of branch interconnects being substantially equal;

means coupled to a branch interconnect of the conductivity tree for locally deskewing the internal clock signal and for generating a local clock signal therefrom, the local clock signal synchronously operating a logic cluster in temporal proximity to the local deskewing means.

13. The clock distribution network of claim 12 wherein the branch interconnects each have a characteristic impedance that is substantially matched.

14. The clock distribution network of claim 12 Wherein the global deskewing clock means comprises a phase-blocked loop circuit.

* * * * *

UNITED STATES PATENT AND TRADEMARK OFFICE
CERTIFICATE OF CORRECTION

PATENT NO.   : 6,229,861 B1
DATED        : May 8, 2001
INVENTOR(S)  : Young

It is certified that error appears in the above-identified patent and that said Letters Patent is hereby corrected as shown below:

Column 6,
Line 16, delete "delayed" and insert -- delay --.
Lines 28-29, delete "comprising passive" and insert -- comprising a passive --.

Column 7,
Line 13, delete "plurality" and insert -- a plurality --.

Signed and Sealed this

Twenty-first Day of May, 2002

Attest:

JAMES E. ROGAN
Attesting Officer
Director of the United States Patent and Trademark Office